2,861,583
FLOAT VALVES

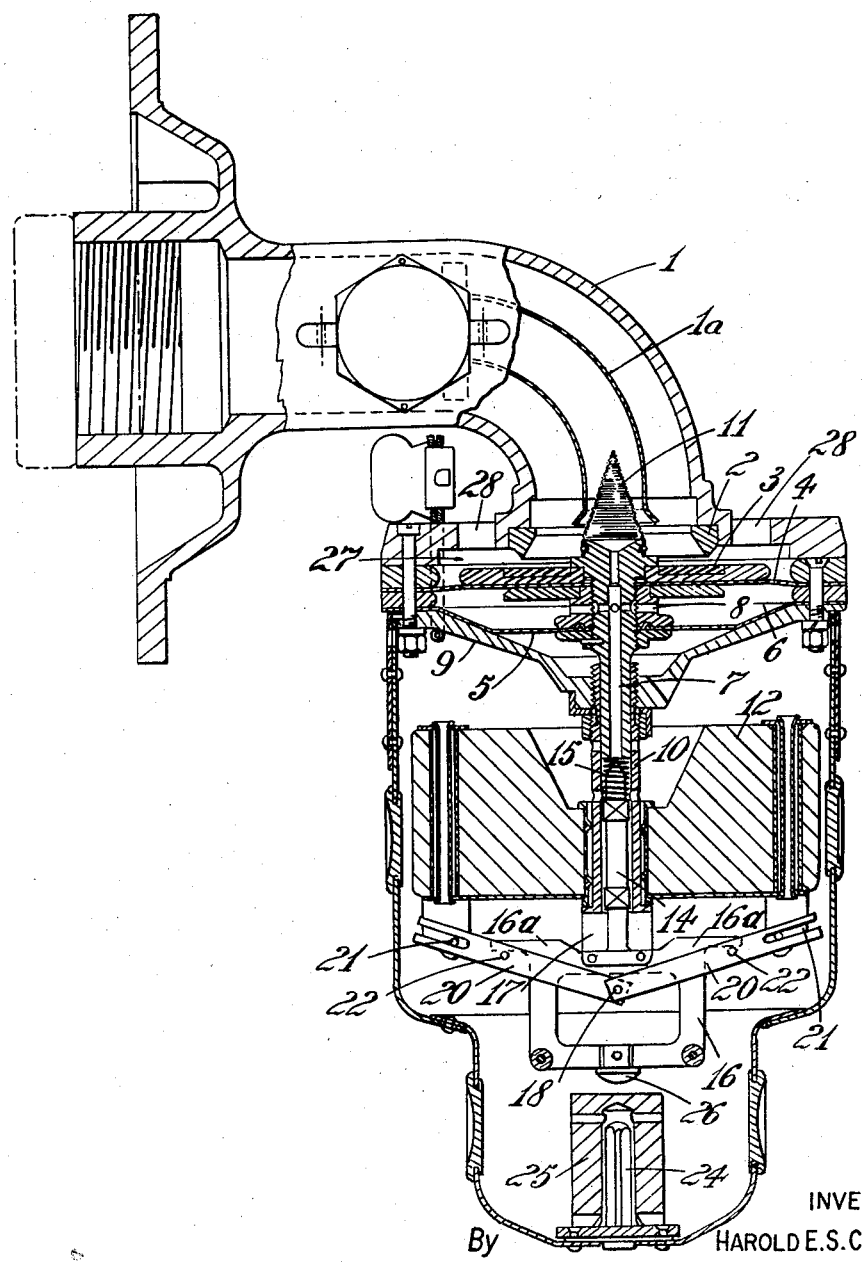
INVENTOR
HAROLD E.S. COLLIVER
ATTORNEYS 2,861,583
Patented Nov. 25, 1958

Harold Edward Sydney Colliver, Chalfont St. Peter, England, assignor to Bernard Bercovitz, Toronto, Ontario, Canada Application January 23, 1956, Serial No. 560,816

Claims priority, application Great Britain January 24, 1955

1 Claim. (Cl. 137—39)

The invention relates to float valves for controlling the level of a liquid in a tank or other vessel and is concerned with such valves which are to be used under conditions such that they may be subjected to negative "g" or be inverted (e. g. valves for use in high speed aircraft).

When a valve of the above kind is inverted or subjected to negative "g" the float tends to operate in a reverse sense and the valve may therefore not only fail to fulfil its intended functions but may permit unsafe conditions (e. g. overfilling of the vessel) to arise. It is an object of the invention to provide a valve of the kind with means which will, when the valve is inverted or subjected to negative "g," move the valve to a closed position.

According to the invention a float valve of the above kind is characterised by a weight which is inactive during normal operation of the float but in the event of inversion of the valve or the application of negative "g" thereto, applies directly or indirectly a load to the movable member of the valve to set the valve in the closed position.

In one construction of the valve according to the invention, the float operates with rising liquid level under normal conditions to close the valve and, in the event of inversion or application of negative "g," the weight operates to close the valve.

It is preferred that, during normal operation, the float pushes the movable valve member towards the closed position without being positively connected thereto whereby the weight may, when active, operate on the valve member independently of the float.

The valve aforesaid may act as a pilot valve and control the application of fluid pressure to operating means for a main control valve.

There will now be described, by way of example of the invention, one specific construction of a valve which is to be used in a fighter aircraft for controlling the flow into a fuel tank, of fuel under pressure from a booster pump. The description will refer to the accompanying drawing which represents a section through the valve.

The valve is located within the tank (not shown) near the top thereof and at the end of a down-turned inlet elbow 1 having an internal guide tube 1a. Around the mouth of the elbow is a downwardly facing fixed valve seat 2 and beneath the seat there is a movable closure member 3 carried on a flexible diaphragm 4. There is a closed chamber 6 beneath the diaphragm arranged so that application of the pressure of the incoming fuel within the chamber causes the diaphragm to move the closure member 3 against the seat. The bottom of the chamber 6 is constituted by a diaphragm 5 of which the outer portion is supported on a rigid dished member 9. Secured to the centers of the diaphragms 4 and 5 and closure member there is a tubular stem 7 which passes through the diaphragms and member and has a lateral opening 8 to the chamber. The lower part of the stem is supported in a guide tube 10. The upper end of the stem is open, through a constricted passageway and a gauze cap 11, to the fuel pressure in the elbow 1 and the lower end, which is less constricted, opens into the tank.

Beneath the diaphragm chamber 6 there is an annular float 12 which is guided on the outside of the lower part of the guide tube 10 for up and down movement. Within this part of the guide tube there is a valve needle 14 which, when moved upwardly against a light spring 15 seats on and closes the lower end of the movable stem 7. An enlarged head 16 is secured to the lower end of the valve needle 14, the head having two laterally projecting ears 16a. The lower end 17 of the fixed guide tube 10 is forked and, pivoted at 18 within the fork, are the ends of two opposed levers 20 of which the other ends have pin and slot connections 21 to the underside of the float 12. Intermediately in the length of each lever there is a pin 22 which is positioned to engage the underside of one of the ears 16a on the valve needle head 16.

Underneath the head 16 there is a fixed upright guide pillar 24, and a weight 25 which is slidable up and down on the pillar. The weight is engageable with a button 26 on the underside of the head 16 but has no positive connection to the valve needle.

In the operation of the valve, if the level in the tank falls below that desired, the float 12 falls and the pilot valve needle 14 opens the lower end of the stem 7. This puts the diaphragm chamber 6 into communication with the tank and releases any pressure in the chamber. The main diaphragm-controlled valve 2, 3 then opens under the fuel pressure and fuel flows through pipes 1 and 1a, cavity 27 and ports 28 into the tank. When the desired fuel level is reached, the float 12 rises and engages the pins 22 on the levers 20 with the ears 16a on the pilot valve head thereby to push the valve needle upwardly to close the outlet through the stem 10 from the diaphragm chamber 6. Pressure then builds up in the chamber through the upper end of the stem and the main valve member 3 is moved, by pressure acting between the diaphragm 4 and the outer, supported, part of diaphragm 5, to the closed position, the valve member 3 being followed up by the pilot valve needle.

If the valve is inverted or subjected to negative "g," the weight 25 moves against the button 26 on the head of the pilot valve needle 14 and moves the needle to the closed position, the main valve then being moved to (or held in) the closed position by pressure on the diaphragm as above described. The float under these conditions is inoperative and the levers move out of contact with the valve head.

I claim:

The combination of a tank having an inlet for liquid under pressure with a valve assembly for controlling the level of a liquid in the tank by control of the flow of liquid through the inlet into the tank, which valve assembly comprises a valve body; a main seat supported by the body and a main movable valve member engageable with the seat to shut off the inlet; a chamber having one wall comprised of a flexible diaphragm which is operative on application of fluid pressure to the chamber to move the main valve member into engagement with the seat to close the valve, the chamber having a restricted inlet from the liquid inlet and relatively less restricted outlet to the tank; a pilot valve member movable upwardly when the valve assembly is upright to close the outlet; a float responsive to the level of liquid in the tank when the valve is upright to move the pilot valve member to closed position when said level reaches a predetermined height, whereby pressure is caused to build up in the chamber and acts on said diaphragm to engage the main valve with said seat; and a weight which is supported from the body out of engagement with the pilot valve member when the valve is upright and subjected to positive "g," but is movable relative to the body on inversion of the valve or application of negative "g" thereto, to engage the pilot valve member and to move said pilot valve member to the position in which it closes the outlet.

References Cited in the file of this patent

UNITED STATES PATENTS

| | | |
|---|---|---|
| 1,916,060 | Memini | June 27, 1933 |
| 2,789,556 | Clark | Apr. 23, 1957 |